United States Patent [19]

Bazes

[11] Patent Number: 4,980,585
[45] Date of Patent: Dec. 25, 1990

[54] METHOD AND APPARATUS FOR SYNTHESIZING DIGITAL WAVEFORMS

[75] Inventor: Mel Bazes, Haifa, Israel

[73] Assignee: Intel Corporation, Santa Clara, Calif.

[21] Appl. No.: 444,670

[22] Filed: Dec. 1, 1989

[51] Int. Cl.$^5$ .................. G06F 1/02; H03B 19/00; H04M 1/50; H04M 1/26

[52] U.S. Cl. .................. 307/529; 364/718; 364/717; 328/14

[58] Field of Search .................. 307/602, 606, 529; 328/14; 364/718, 851

[56] References Cited

U.S. PATENT DOCUMENTS

| | | | |
|---|---|---|---|
| 3,701,027 | 10/1972 | Bolton, Jr. | 328/14 |
| 3,983,493 | 9/1976 | Glastone | 328/14 |
| 3,984,668 | 10/1976 | Zetterberg et al. | 364/717 |
| 4,132,871 | 1/1979 | Lake | 328/14 |
| 4,692,886 | 9/1987 | Miki et al. | 364/718 |
| 4,727,570 | 2/1988 | Tarbouriech | 328/14 |

*Primary Examiner*—Stanley D. Miller
*Attorney, Agent, or Firm*—Blakely, Sokoloff, Taylor & Zafman

[57] ABSTRACT

An integrated circuit apparatus for performing digital synthesis of regular waveforms having transitions at arbitrary points in time is disclosed. A reference clock signal is provided as input to a synchronous delay line apparatus, producing a plurality of taps. The taps signal provides N inputs to a digital-to-time domain converter (DTC), where N is the resolution of the synthesized waveform, said DTC apparatus further receiving inputs from a pattern generator apparatus over a shifter apparatus and a pattern register apparatus. The DTC apparatus combines the taps signal and the input from said pattern register to produce a synthesized waveform. In the presently preferred embodiment, the DTC apparatus comprises a plurality of pairs of N-type and P-type devices connected as transmission gates. When the transmission gate is turned on, it transfers the input pattern bits to the output line. When the transmission gate is turned off, it effectively has an infinite impedance and isolates the input pattern from the output line. Only one transmission gate in the DTC apparatus is turned on at one time. The waveform pattern register apparatus has varying depths of master and slave latches. It receives pattern inputs from the pattern generator apparatus and outputs in three separate fields to the DTC apparatus. The bits of the first field of the pattern waveform register are implemented as a solitary master stage. The bits of the second field of the waveform pattern register are implemented as complete master-slave pairs. The bits of the third field of the waveform pattern register are implemented as master-slave-master triads.

24 Claims, 9 Drawing Sheets

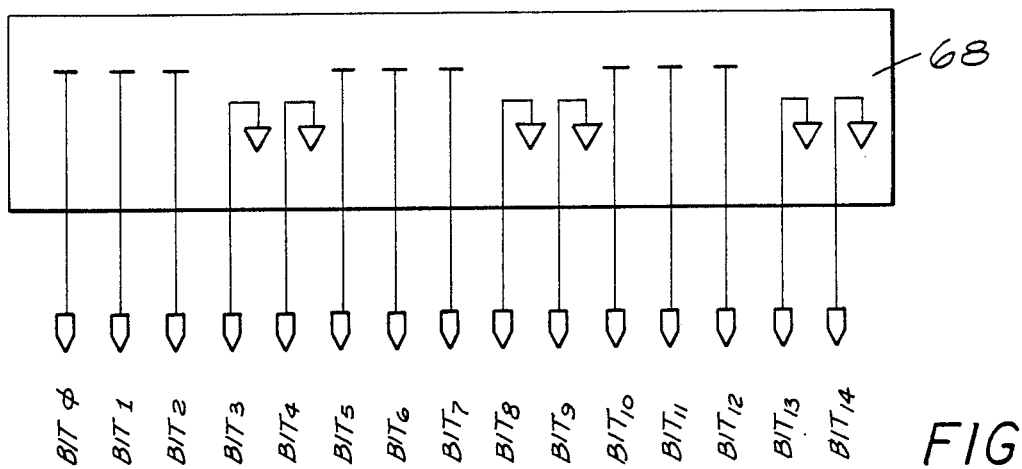
FIG 9A
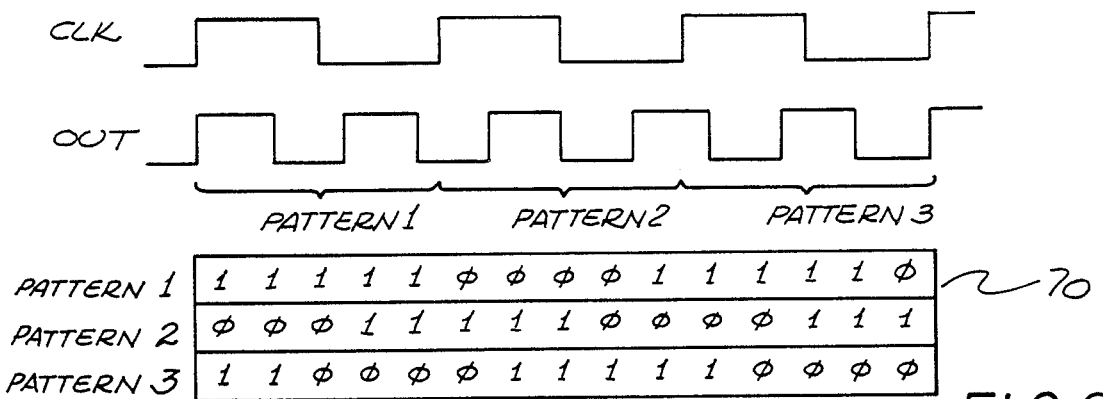
FIG 9B
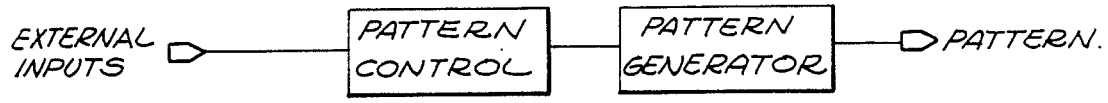
FIG. 9c
FIG 10
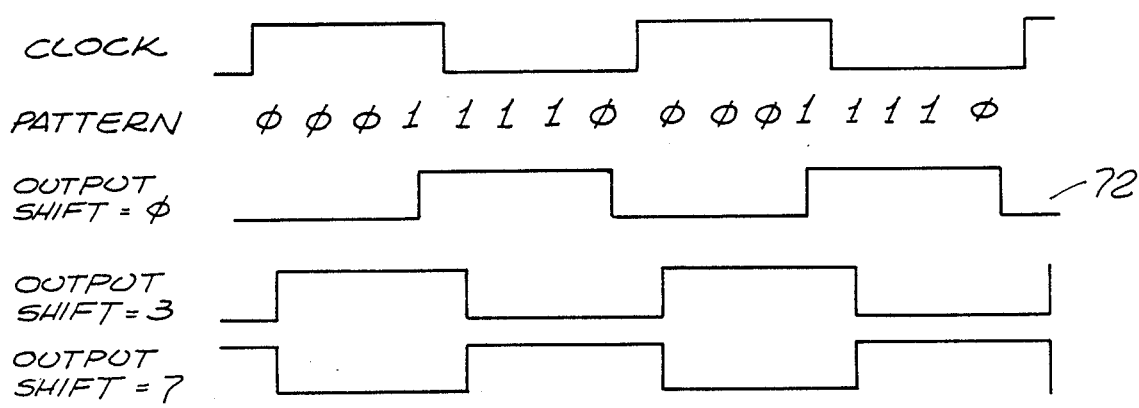

METHOD AND APPARATUS FOR SYNTHESIZING DIGITAL WAVEFORMS

BACKGROUND OF THE INVENTION

1. Field of the Invention

The invention relates to the field of synthesizing digital waveforms having transitions at arbitrary points in time, particularly for metal oxide semiconductor (MOS) circuits.

2. Art Background

It is quite common for intergrated circuits to perform many functions, such as addition and subtraction, that hitherto have been performed by analog techniques. However, many furnction in computing are still performed with analog techniques. Examples of such functions are frequency multiplication, random waveform synthesis, duty-cycle conversion and phase shifting. Some of these functions are performed individually by dedicated circuits but others are not possible at all using existing analog techniques or digital circuitry.

Generally, in the prior art, two methods exist for frequency multiplication: using a phase-locked loop (PLL) or dividing a high frequency reference clock down to the desired multiply frequency. Although the prior art methods accomplish frequency multiplications by an integer, the PLL method is difficult of implement in MOS technology, while the frequency-division method does not generally provide an output that is entirely synchronized to the input. Furthermore, no general applicable methods are known for performing duty-cycle conversion nor any generally applicable methods are known for performing random waveform generation or controlling phase shift.

As will be shown below, the present invention provides a circuit for synthesizing digital waveforms having transitions at arbitrary points in time. Using CMOS circuits, the present invention performs a variety of functions such as frequency multiplication by an integer, frequency multiplication by a rational number, random waveform synthesis, duty-cycle conversion and phase shifting.

SUMMARY OF THE INVENTION

An integrated circuit apparatus is disclosed for performing digital synthesis of regular waveforms having transitions at arbitrary points in time. A reference clock signal provided as input to a synchronous delay line apparatus, producing a plurality of taps. The taps signal provides N inputs to a digital-to-time domain converter (DTC), where N is the resolution of the synthesized waveform. The DTC apparatus further receive inputs from a pattern generator apparatus over a shifter apparatus and a pattern register apparatus. The DTC apparatus combines the taps signal and the input from said pattern register to produce a synthesized waveform.

In the preferred embodiment, the DTC apparatus comprises a plurality of pairs of N-type and P-type devices connected as transmission gates. When the transmission gate is turned on, it transfers the input pattern bits to an output line. When the transmission gate is turned off, it effectively has an infinite impedance and isolates the input pattern from the output line. Only one transmission gate in the DTC apparatus is turned on at one time. The waveform pattern apparatus, comprising varying depths of master and slave latches, receive pattern inputs from the pattern generator apparatus and output in the separate fields to the DTC apparatus. The bits of the first field of the pattern wave register are implemented as a solitary master stage. The bits of the second field of the waveform pattern register are implemented as complete master-slave pairs. The bits of the third field of the waveform pattern register are implemented as master-slave-master triads.

FIG, 8 is timing diagram of the waveform pattern registers used in the presently preferred embodiment of the invention.

FIG. 9A is an electrical schematic of a hard-wired pattern generator used in one of the presently preferred embodiments of the invention.

FIG. 9B illustrates the pattern output of a ROM/RAM pattern generator for frequency multiplication used in one of the presently preferred embodiments of the invention.

FIG. 9C is a block diagram of a real-time pattern generator used in one of the presently preferred embodiments of the invention.

FIG. 10 is a timing diagram of a varying waveform phase through the use of a left shifter used in the presently preferred embodiment of the invention.

DETAILED DESCRIPTION OF THE INVENTION

A circuit is disclosed for performing digital synthesis of a rectangular waveform having transitions at arbitrary points in time. In the following description, numerous specific datails are set forth, such as specific circuits. in order to provide a thorough understanding of the present invention. It will be obvious, however, to one skilled in the art, that the present invention may be practiced without these specific details. In other instances, well-known circuits, such as a shifter, are not described in order not to unnecessarily obscure the present invention.

As will be seen with the present invention. a reference clock period is divided up into N intervals, where N is the number of taps in the synchronous delay line (SDL). A digital-to-time domain converter (DTC) converts a static pattern of ones and zeros into a dynamic waveform. Thus, a waveform of arbitrary shape may be constructed simply by changing the contents of the pattern that is inputted to the DTC. Furthermore, if the pattern is changed at every clock interval, the shape of the waveform also changes at every clock interval. Thus, the DTC can provide an essentially endless variety of waveforms in a straight forward fashion. The applications for the circuit of generating digital synthesis of rectangular waveforms as described in the prior art section include frequency multiplication, duty-cycle conversion, pseudo-random waveform generation, phase shifting, and others.

In the presently preferred embodiment, the invention is realized as part of a metal oxide semi-conductor (MOS) integrated circuit. The invention may be fabricated employing any one of the many well-known MOS processes or complementary CMOS processes.

Figure 1A:
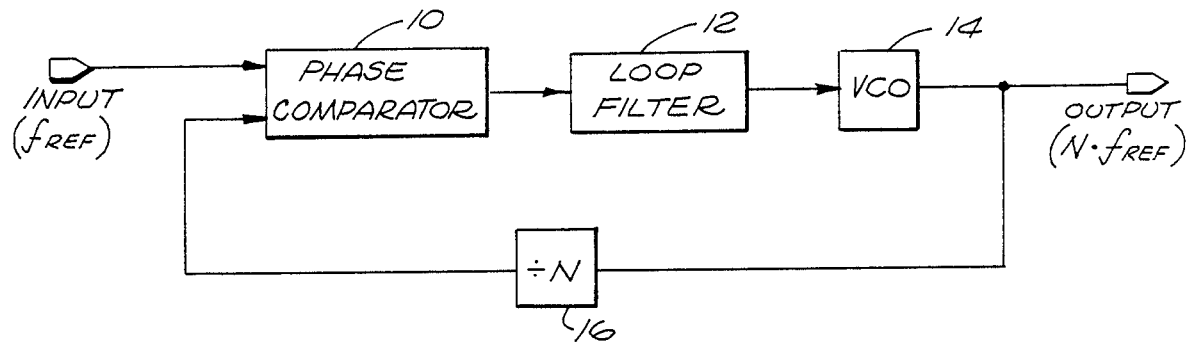
FIG. 1A illustrates prior art circuit for accomplishing some of the frequnecy multiplication functions by an integer.
Figure 1B:
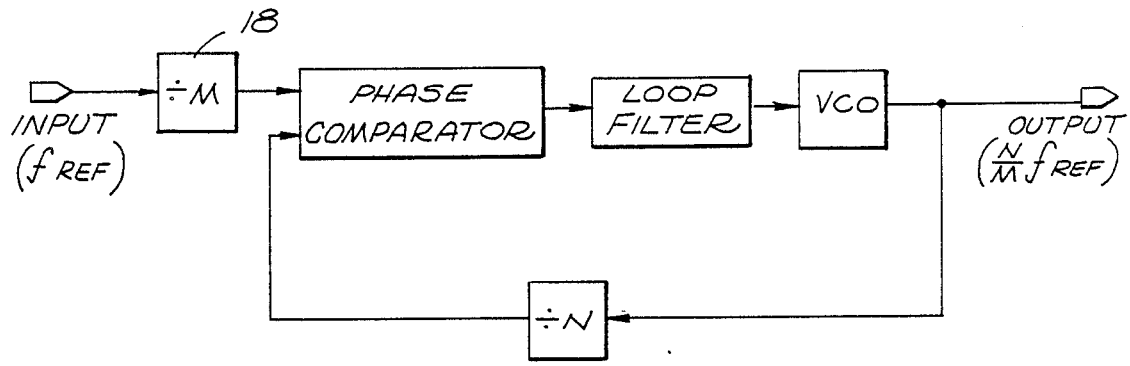
FIG. 1B illustrates prior art circuit for performing frequency multiplication by a rational number.
Figure 1C:
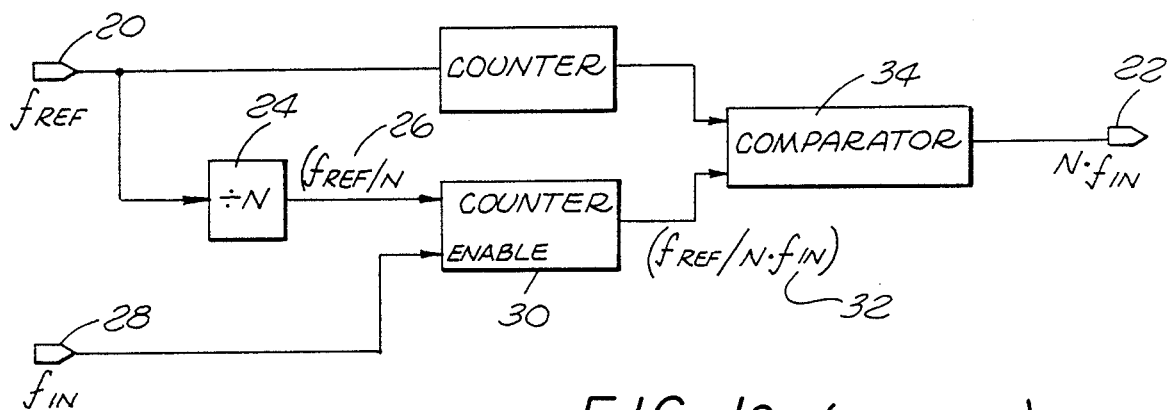
FIG. 1C illustrates another prior art method for performing frequency multiplication by an integer.
Figure 1D:
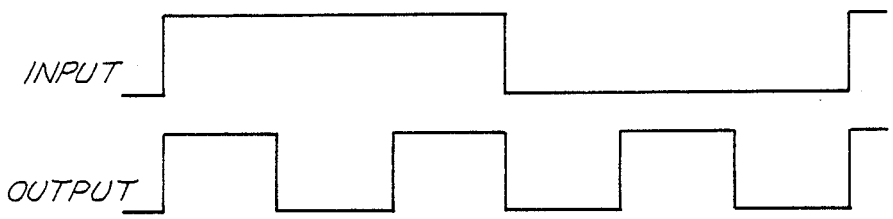
FIG. 1D shows the input and utput timing waveforms for a frequency multiplication by an integer N, where N=3.
Figure 1E:
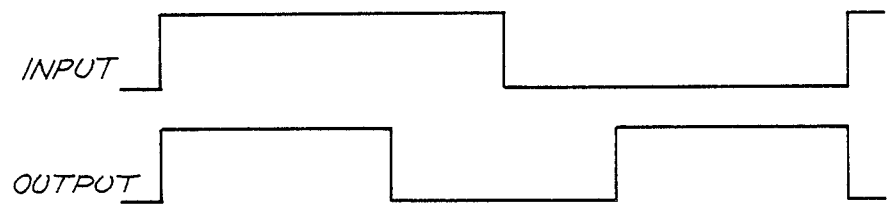
FIG. 1E shows the input and output timing waveforms for a frequency multiplication by a rational number, N/M, where N=3 and M=2.
Figure 1F:
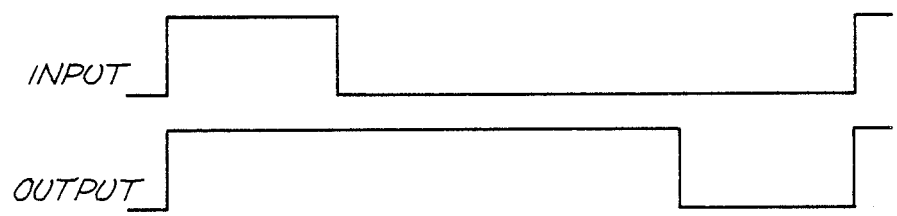
FIG. 1F shows the input and output timing waveforms for a duty-cycle conversion from 25% to 75%.

FIG. 1A-C illustrate prior art methods of accomplishing frequency multiplication. FIG. 1D-F are input and output waveforms characteristics of frequency multiplication, frequency division, duty-cycle conversion, and pseudo-random waveform generation. In FIG. 1A, a phase-locked loop (PLL) is shown to perform a frequency multiplication, $N^* f_{REF}$, of an input reference frequency $f_{REF}$, where N is a multiplier integer. In general, a PLL comprises a phase comparator 10, a loop filter 12, a voltage-controlled oscillator (VCO) 14 and a divider 16 in a closed loop. The input and output waveforms for a frequency multiplication where N=3 are illustrated in FIG. 1D. Similarly, to multiply an input reference frequency $f_{REF}$ by a rational number N/M to produce $N/M^* f_{REF}$, where N and M are both integers, a PLL having an additional divider 18 at its input is used as illustrated in FIG. 1B. The input and output waveforms for a frequency multiplication where N=3 and M=2 are illustrated in FIG. 1E.

However, the PLL is subject to a number of design constraints, such as the capture-range margin for the VCO and the stability margin for the loop filter. Capture-range margin refers to the narrow range of input frequencies within which the VOC stays locked at the desired output frequencies. Stability margin assures the stability of the PLL by limiting the loop gain to one or close to it. See, Horowitz, P. and Hill, W. *The Art of Electronics* (Cambridge University Press, No. 1980) pp. 432–437. In contrast, CMOS devices are required to operate over large temperature, processing and supply voltage ranges. Implementing PLL function in CMOS is very difficult because the capture-range and stability margins are difficult to guarantee over the large process variations typical of MOS technologies. Moreover, the phase difference between the output waveform and the input clock is unpredictable if PLL is implemented in CMOS to perform frequency multiplication.

FIG. 1C illustrates another proir art method of performing frequency multiplication: dividing a high-frequency clock reference $f_{REF}20$ down to the desired multiplied frequency $N^* f_{IN}22$. The frequency clock reference $f_{REF}20$ is first divided down by N via a divider 24, where N is a multiplier integer to yield a frequency $f_{REF}/N$ 26. An input frequency $f_{IN}28$ is used to count number of $f_{REF}/N$ periods in one $f_{IN}$ period by enabling a first counter 30 during a single period of $f_{IN}$, producing $f_{REF}/(N^* f_{IN})32$. $f_{REF}/(N^* f_{IN})$ is further divided by $f_{REF}20$ at a comparator 34 to produce $N^* f_{IN}22$. The method shown in FIG, 1C introduces a round-off error in the final output frequency 22. This error causes the output frequency to be somewhat larger than the desired frequency $N^* f_{IN}$. The error may be decreased by increasing the reference frequency, by CMOS imposes a limit on how large the reference frequency may be. Thus, this error cannot be entirely eliminated. It follows that the output frequency is not synchronized with the input frequency.

Figure 1G:
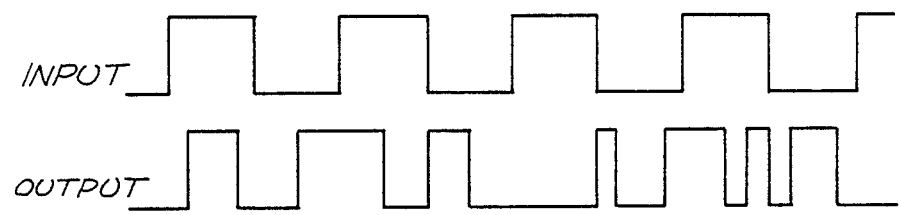
FIG. 1G shows the input and output timing waveforms for a pseudo-randown waveform generation function.

Although the prior art methods descrebed in FIG. 1A-C accomplish frequency multiplication and division, no general methods are known for duty-cycle conversion or random waveform generation. The input and output waveforms for duty-cycle conversion and random waveform generation are illustrated in FIG. 1F and 1G, respectively. As shall be described below in detail, the present invention synthesizes digital waveforms from rectangular waveforms to perform frequency multiplication by an integer, frequency multiplication by a rational number, duty-cycle conversion, pseudo-random waveform generation, phase shifting and other functions.

Figure 2:
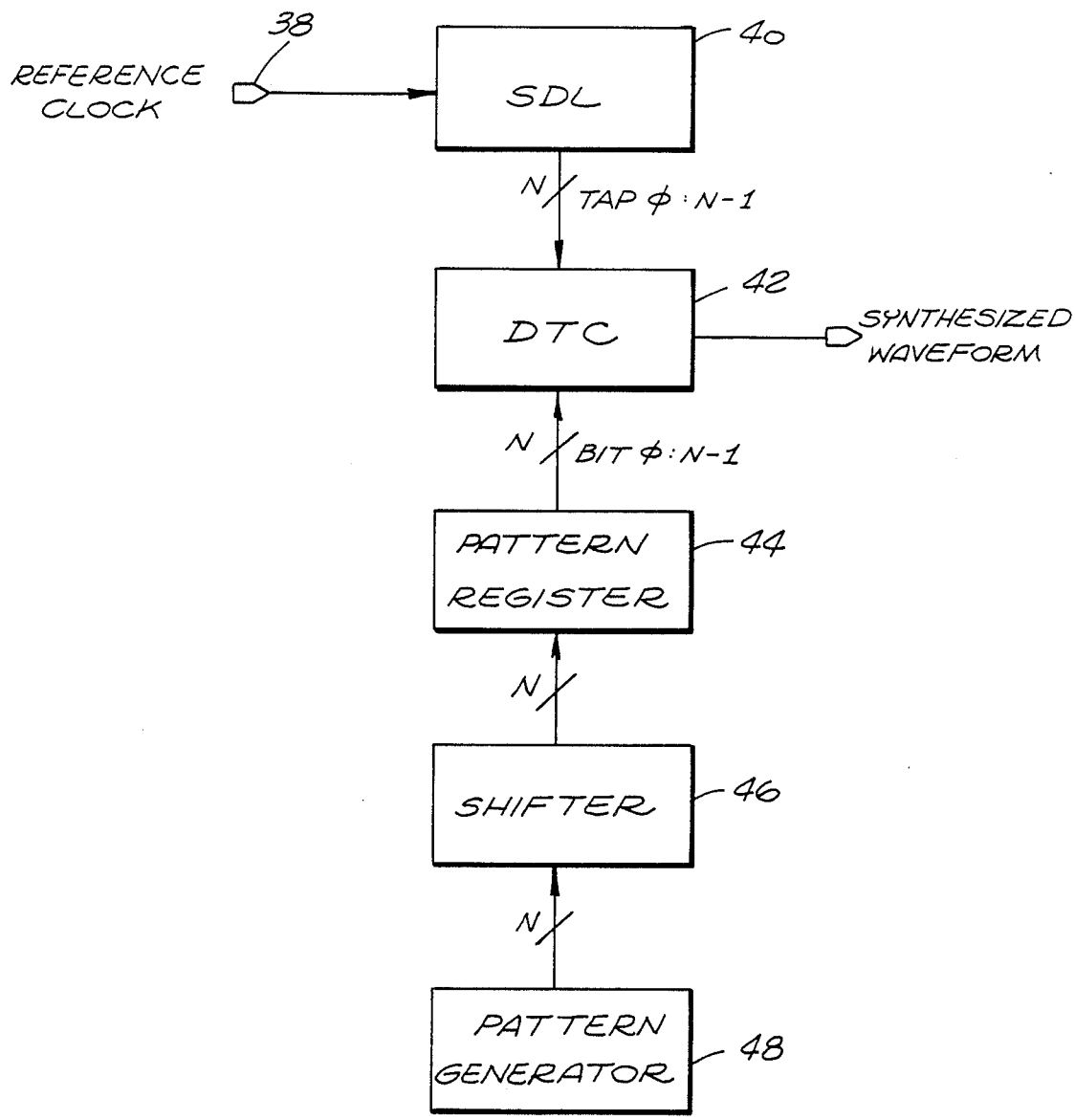
FIG. 2 is a block diagram illustrating the preferred embodiment of the present invention.
Figure 3:
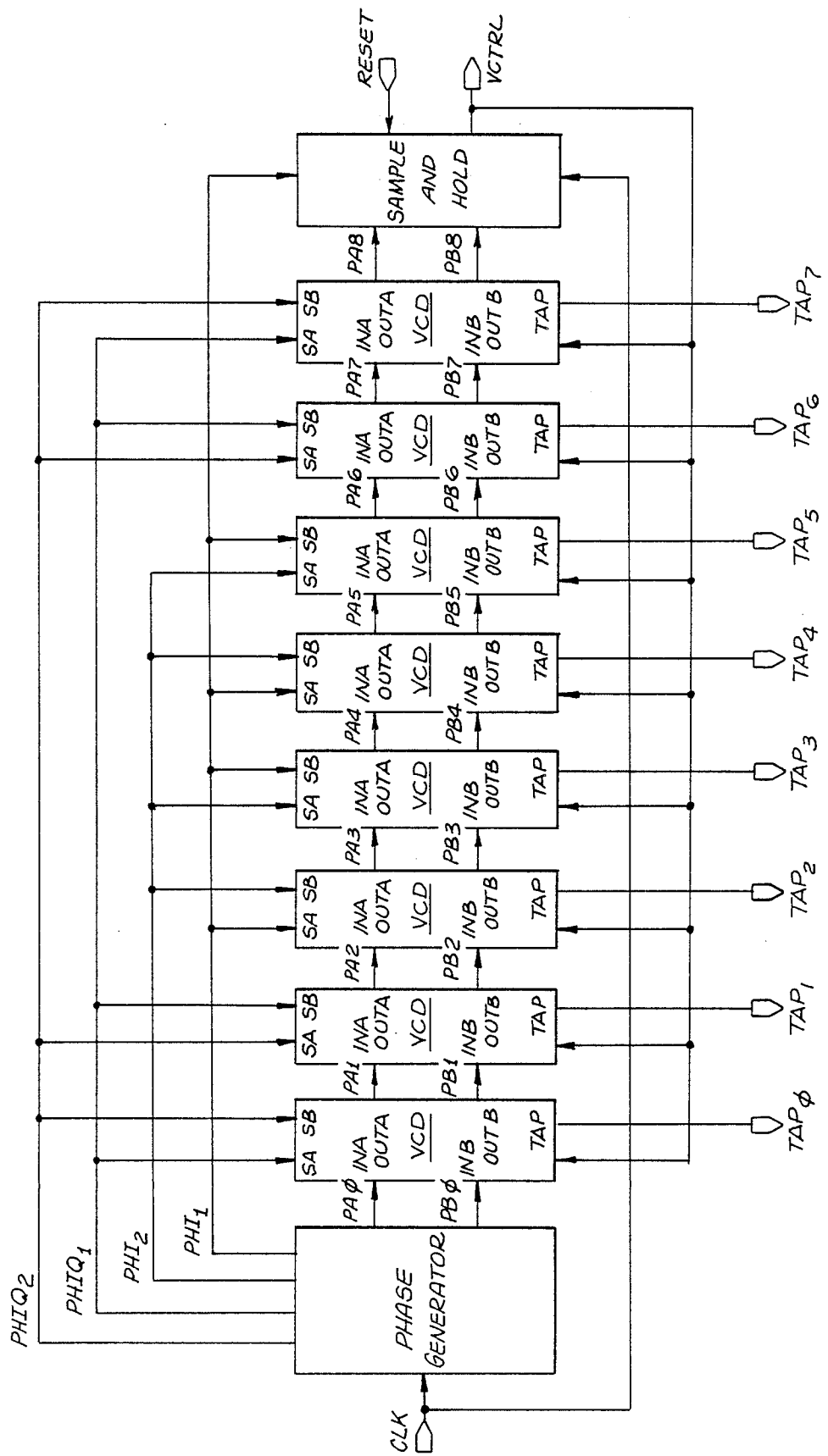
FIG. 3 is an electrical schematic of a synchronous delay line used in the presently preferred embodiment of the invention.

In FIG. 2, the preferred embodiment of the present invention is illustrated as a circuit 36. The circuit 36 requires, as an input, a reference clock signal 38. A synchronous delay line (SDL) 40 is shown receiving the reference clock signal 38. The circuit embodying SDL 40 is illustrated in FIG. 3. The preferred embodiment of the SDL for use with the present invention is described fully in the pending patent application, Ser. No. 07/434,408, filed 11/13/89 and entitled "SYNCHRONOUS DELAY LINE WITH QUADRATURE CLOCK PHASES". Although the SDL in FIG. 3 shows eight taps, TAP 0:7, it should be understood to one skilled in the art that producing sixteen taps, TAP 0:15, for the presently preferred embodiment merely requires the addition of eight more voltage controlled delays (VCD's). Prior art techniques of utilizing a synchronous delay line are described in U.S. Pat. No. 4,496,861 entitled "INTEGRATED CIRCUIT SYNCHRONOUS DELAY LINE" and in an article entitled "A NOVEL Precision MOS Synchronous Delay Line", IEEE Journal of Solid State Circuits, Volume SC-20, pp. 1265-1271, Dec. 1985. The SDL is used to generate timing pulses designed to have precise delays from the start of a clock period. This particular SDL receives a clock reference signal and provides a seres of taps, wherein each tap provides a timing pules that has a precise delay from the commencement of a clock cycle which is initiated by the reference clock. The SDL provides timing pulses, TAP0:N-1, that are delayed by a precise delay with respect to the start of a clock period. The delay of each tap is given by:

$$tDEL_n = \frac{(n+1)^* TP}{N} + t_{ERR},$$

where TP is the clock period, N is the number of SDL taps, $t_{ERR}$ is a small delay error and $tDEL_n$ is delay of the timing pulse output by $TAP_n$, where n ranges from 0 to N−1, and N corresponds to the number of taps in SDL 40. The delays $tDEL_n$ are substantially insensitive to variation in operating conditions and processing. While N is the number of SDL taps, it is also the resolution of a synthesized waveform 50. An example of the output timing waveforms for a 16-tap SDL appears in FIG. 4. CLK is the reference clock and $TAP_0$-$TAP_{15}$ are the output timing pulses. The rising edge of each output pulse is the edge that is delayed by a precise time from the start of the reference clock period and is therefore marked by an arrowhead.

Figure 4:
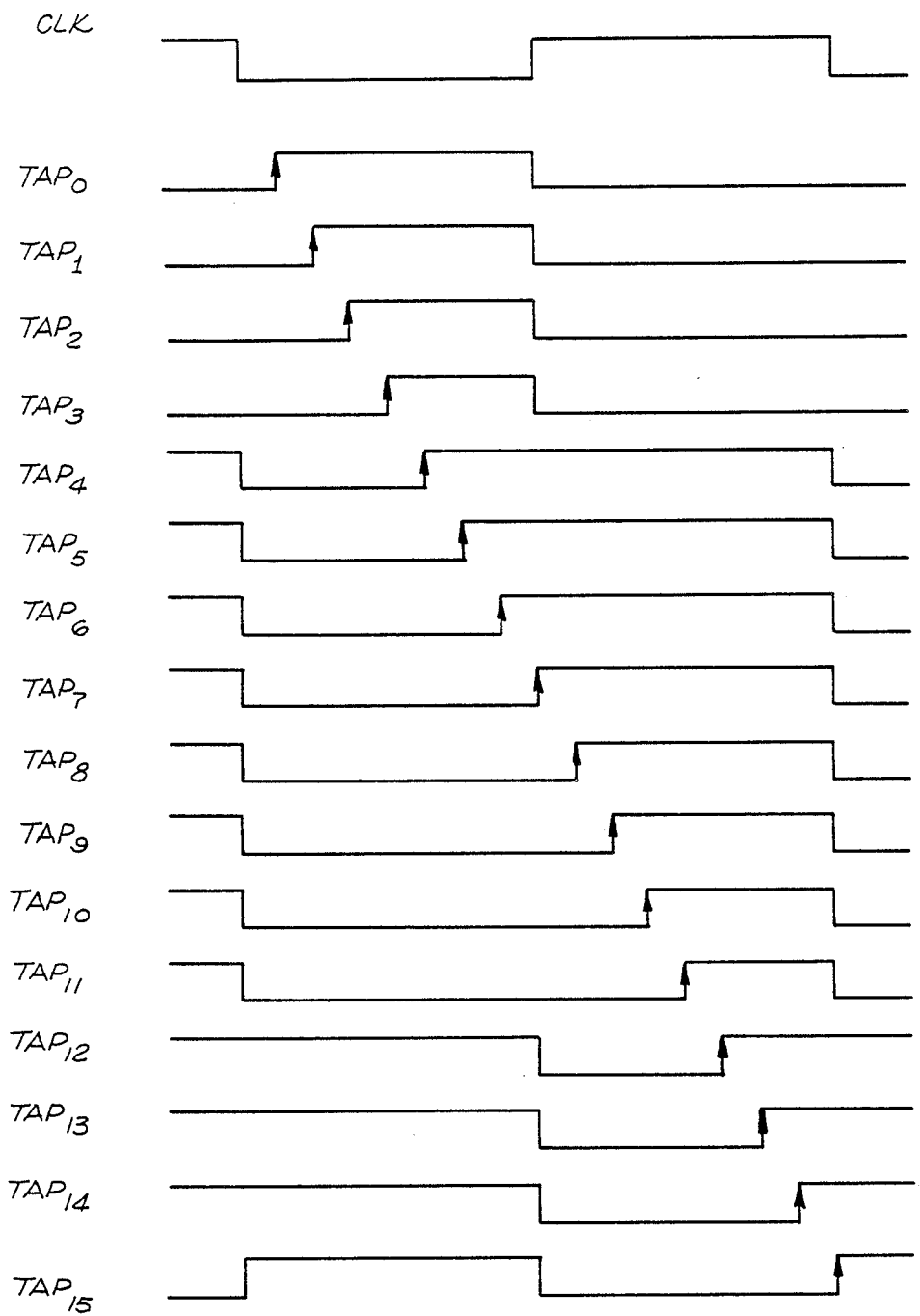
FIG. 4 is a timing diagram of the output waveforms of the SDL in FIG. 3, where N=16.

In FIG. 4, the SDL taps are divided into three fields: the first ¼ of the taps, from $TAP_0$-$TAP_3$; the middle ½ of the taps, from $TAP_4$-$TAP_{11}$; and the last ¼ of the taps from $TAP_{12}$-$TAP_{15}$. In the case of the 16-tap SDL, the outputs of the first and the last four taps, i.e., the first and the third fields of the SDL are de-asserted in the middle of the clock period while the outputs of the middle eight taps, i.e., the second field, are deasserted at the start of a clock. period. By de-asserting the outputs of the first and thrid field in the middle of a clock period, solid low and high times are achieved on these outputs. Had these outputs been de-asserted at the start of a clock period, the low and high times would have been inadequate; or, as in the case of the last tap, i.e. $TAP_{15}$, the low time would have been zero. In other words, the output would have been non-existent or little more then a glitch. It should be noted that the boundaries between the tree fields are a design choice and need not necessarily be as given here. The method used to achieve large tap low and high times is described in greater detail in the pending application, Ser. No. 07/434,408, filed Nov. 13, 1989 and entitled, "SYCHRONOUS DELAY LINE WITH QUADRATURE CLOCK PHASES".

Figure 5:
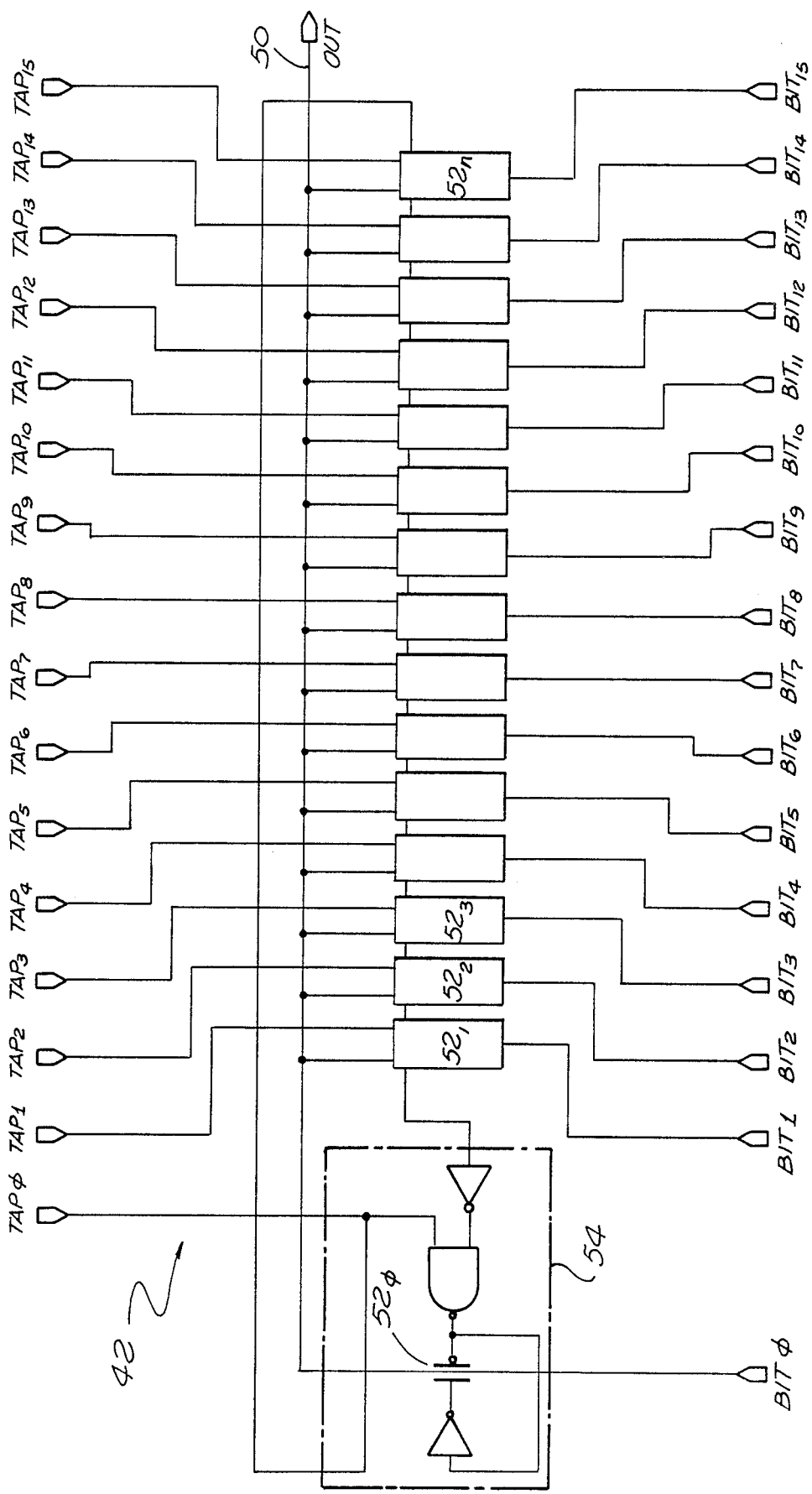
FIG. 5 is an electrical schematic of a digital-to-time domain converter (DTC) used in the presently preferred embodiment of the invention.

In FIG. 5, a digital-to-time domain converter (DTC) 42 receives tap waveform, TAP0:N−1, from the SDL 40. The DTC 42 comprises identical stages with the input to each stage connected to $TAP_n$ of the SDL 40 and to the BIT 0:N−1of a waveform pattern register 44. The outputs from all of the stages are "shorted" together to form a single common output line 50. Each stage of the DTC 42 further comprises a pair of N-type and P-type devices connected as a transmission gate $52_n$, where n ranges from 0 to N−1, and N corresponds to the number of taps in SDL 40. When the transmission gate $52_n$ is turned on, it transfers the input pattern bit associated with TAPn to the output line 50. When the transmission gate $52_n$ is turned off, the transmission gate effectively has an infinite impedance and isolates the input pattern bit from the output line. One, and only one transmission gate in the DTC 42 is turned on at time. Thus, one and only one input pattern bit affects the output at a time.

Figure 6:
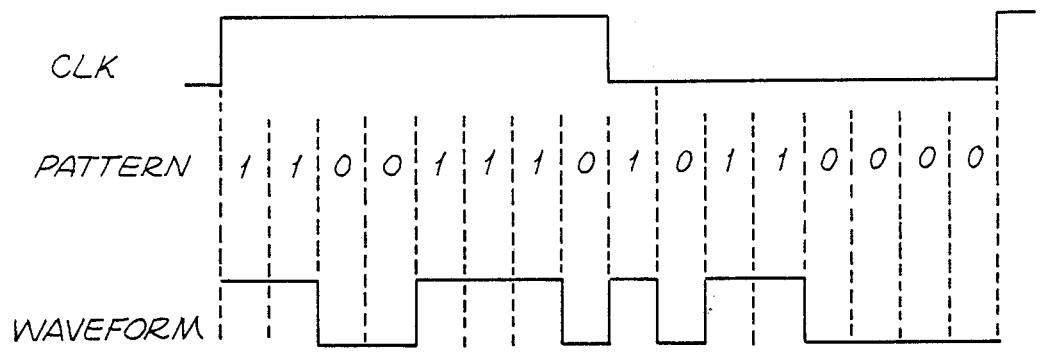
FIG. 6 illustrates the conversion of static pattern into a dynamic waveform by the DTC used in the presently preferred embodiment of the invention.

FIG. 6 illustrates the conversion by the DTC of a static digital pattern into a dynamic waveform. The static digital pattern is N bits long, so that each bit represents 1/N of the output waveform. The static digital pattern is also the BIT 0:N−1 from the waveform pattern register 44. At the same time, the reference clock period is divided into N intervals, where N is the number of taps in the SDL 40. It follows that each bit of the static digital pattern represents 1/N interval the clock period. When a SDL tap goes high, the pattern bit associated with that tap is output as either a high (if the bit a one) or a low (if the bit is a zero). Thus, a waveform of arbitrary shape may be constructed simply by changing the contents of the pattern that is input of the DTC. Furthermore, if the pattern is changed at every clock, the shape of the waveform also changes at every clock. Thus, the DTC 42 can provide essentially an endless variety of waveforms in a straight forward fashion.

Referring to FIG. 5, the transmission gate $52_n$ of the DTC 42 is turned on by switching circuit 54 only if $TAP_n$ is high and $TAP_{n+1}$ is low. Since $TAP_n$ goes high at a time equal to TP/N before $TAP_{n+1}$ goes high, pattern bit n affects the output for a time equal to TP/N. TP is the period of the reference clock. As the SDL taps TAP0:N−1 sequentially go high, pattern bits sequentially are connected too, and then after TP/N disconnected from the DTC output 50. DTC 42 performs digital-to-time domain conversion. Typically, the SDL tap-to-tap delay ranges from 1.5 nanoseconds to over 3.0 nanoseconds using contemporary CMOS technology. In other words, the conversion rates range between 300 to 600 Megabits per second. This speed of conversion is characteristic of bi-polar of GaAs technologies, not CMOS technology. The combination of DTC and SDL provides conversion performance that is well beyond the characteristic performance of CMOS technology.

Figure 7:
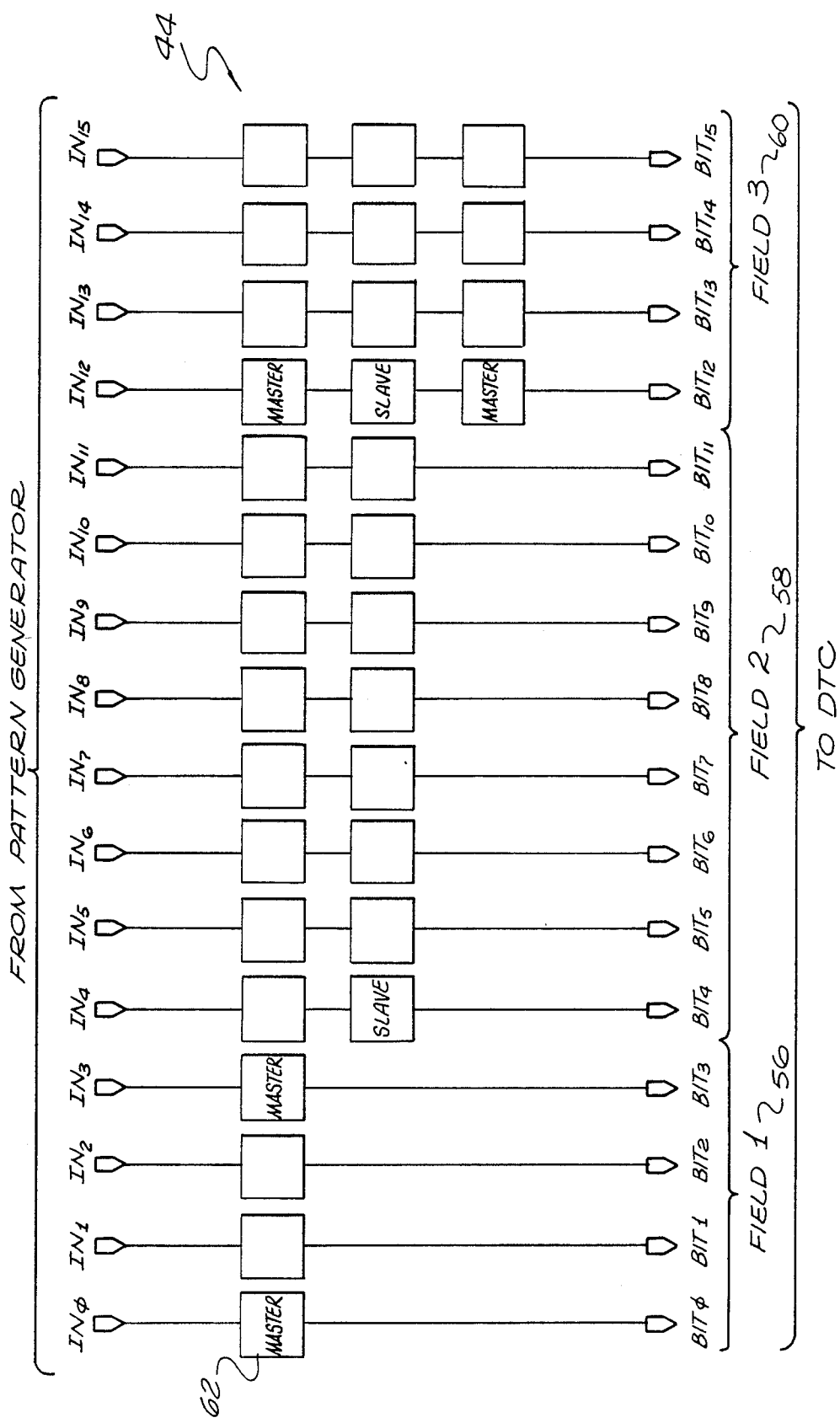
FIG. 7 is an electrical schematic of a waveform pattern register used in the presently preferred embodiment of the inevention.

FIG. 7 illustrates a waveform pattern register used in the preferred embodiment of the present invention. The waveform pattern register 44 receives its inputs $IN_{0-N-1}$ from a pattern generator 48. The output of the waveform pattern register 44, $BIT_{0-N-1}$, is fed to the DTC 42. The waveform pattern register 42 comprises three fields of pattern registers 56,58 and 60 and implemented with varying depths of master and slave flip-flop stages. The $BIT_{0-3}$ of the first field 56 are implemented as solitary master flip-flop stages 62. As such, $BIT_{0-3}$ and delayed by ½ clock and become valid before the first tap in the first SDL field (i.e., $TAP_0$) goes high and remains valid until after the last tap in the first SDL field goes high. $BIT_{4-11}$ of the second field 58 of the waveform pattern register 44 are implemented as complete master-slave pairs. Each master-slave pair comprises a master flip-flop 62 coupled to a slave flip-flop 64. $BIT_{4-11}$ of the second field 58 are delayed by a full clock and become valid before the first tap of the second SDL field goes high and remain valid until after the last tap of the second SDL field goes high. Finally, $BIT_{12-15}$ of the third field 60 of the waveform pattern register 44 are implemented as a master-slave-master triad. Each master-slave-master triad comprises a master flip-flop 62 coupled to a slave flip-flop 64 and further coupled to a master flip-flop 66. $BIT_{12-15}$ of the third field 60 are delayed by 1.5 clocks and become valid before the first tap of the thrid SDL field goes high and remain vaild until after the last tap of the third field (i.e., $TAP_{N-1}$, the last SDL tap) goes high. It should be noted that boundaries between the three pattern register fields are a design choice and need not necessarily be as given here.

Figure 8:
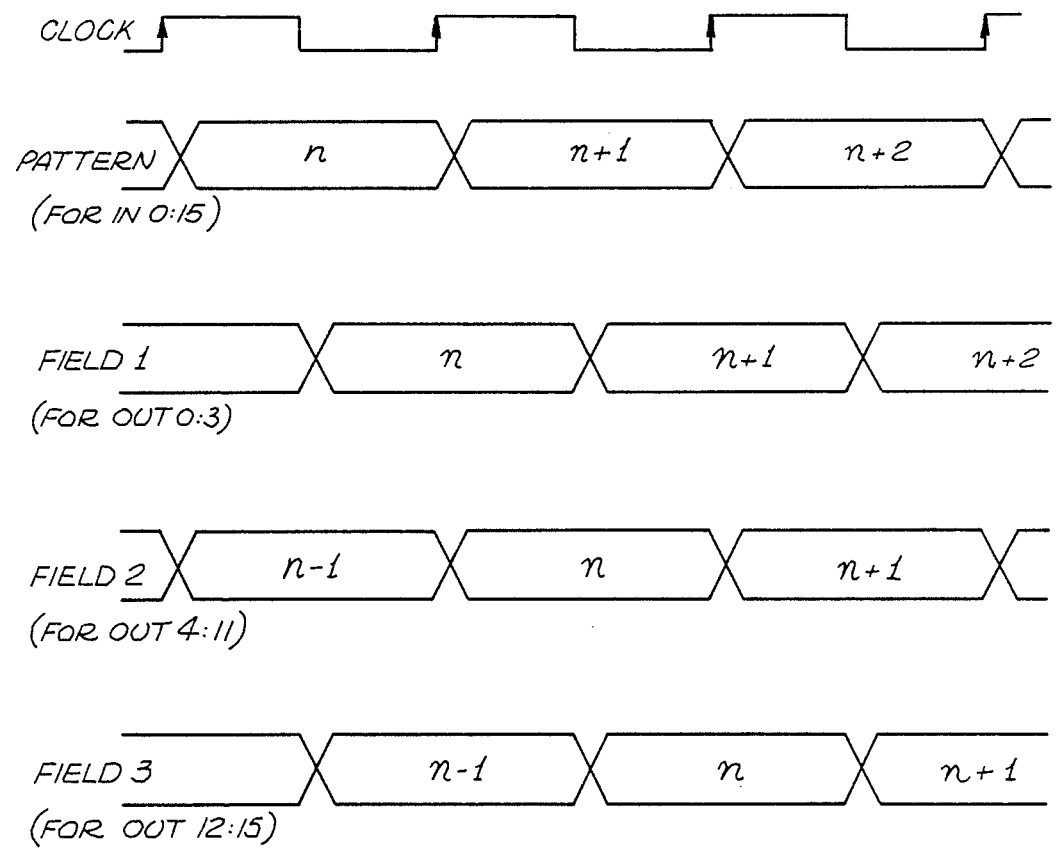

The waveform pattern register 44 stores a pattern of ones and zeros that represent the high and low portion of the output waveform 50. The waveform pattern register 44 may be updated as frequently as once every clock. However, the waveform pattern register 44 may not be updated all at once, since one or more bits in that case may swhitch at the same time when the corresponding tap from the SDL 40 is outputting that bit. In order to update the waveform pattern register 44, the register is partitioned into three fields 56,58 and 60 where each field corresponds to the three SDL fields as illustrated in FIG. 4. All bits in a field are updated together well in advance of the transitions of the taps in the SDL field that outputs them. In this way, it is impossible for the register update to conflict with the switching of the SDL taps. The timing diagram of the pattern register, including the delays of the three fields, is illustrated in FIG. 8.

Referring again to FIG. 2, the pattern generator 48 and a shifter 46 may be optionally introduced on every cycle into the waveform pattern register 44. In this way, a large variety of waveform patterns may be created from the waveform synthesizer 36. The pattern generator 48 may take on any of a wide variety of forms. In one embodiment of the present invention, a pattern generator 68 which comprises simply a "hard-wired" pattern of ones and zeros as illustrated in FIG. 9A. The hard-wired pattern generator 68 in FIG. 9A would be used for multiplication by the integer 3 for a waveform synthesizer having a resolution of 15 bits per clock. Refer, for example, to the input and output waveforms of a frequency multiplication as illustrated in FIG. 1D. Another application of the same hard-wired pattern generator 68 is in duty-cycle conversion in which the pattern generator provides a waveform of the same frequency as the clock frequency but with a different duty cycle than the clock. For an example, please refer to the input and output waveforms of a duty-cycle conversion from 25% to 75% as illustrated in FIG. 1F. The above two applications assume that the same pattern is repeated in each and every clock.

In a second embodiment of the present invention, the pattern generator is a ROM/RAM 70 which stores a different bit pattern in each of its 15 entries. The ROM/RAM patterns are accessed sequentially on every clock so that the output waveform is the pattern obtained by lining up all of the ROM/RAM entries back to back. The waveform output of a ROM/RAM pattern for frequency multiplication is illustrated in FIG. 9B. The ROM/RAM pattern generator 70 is useful, amoung other thing, for implementing frequency multiplication by a rational number N/M where N may be greater than or less than M (if N is less than M, then frequency divison by a rational number is implemented). The number of ROM/RAM entries required to implement such a multiplier is equal to the denominator of the rational number, i.e. to M. For example, the waveform of a MULTIPLY BY 5/3 frequency multiplier and required ROM/RAM pattern for the pattern generator are illustrated in FIG. 9B.

In yet another embodiment of the present invention, the ROM/RAM pattern generator 70 may be used for implementing "pseudo-random" waveform synthesis. For pseudo-random waveform synthesis, the pattern for each clock period is stored in each entry of the ROM/RAM just as for frequency multiplication. The pattern is not, however, truly random (hence the name "pseudo-random") since the pattern repeats itself every N clocks where N is the number of ROM/RAM entries. However, by making N large, i.e., by increasing the number of ROM/RAM entries, the approximation to the true random behavior improves. FIG. 1G illustrates the input and output and output waveforms of a pseudo-random waveform generation. Finally, in yet another embodiment of the present invention, a real-time pattern generator 72 as shown in FIG 9C may be used in lieu of the hard-wired pattern generator 68 or the RAM/ROM pattern generator 70. A real-time pattern generator 72 is copable of producing a new pattern on each and every clock as the result of some logic operation.

Referring again to FIG. 2, the shifter 46 may be optionally provided between the pattern generator 48 and the waveform pattern register 44. The shifter 46 may be used to vary the phase relationship between the input clock and the output waveform. A timing diagram of a left phase shift 72 is illustrate in FIG. 10.

Although the present invention has been described with reference to FGI. 1-10, it will be understood that the figures are for illustration only and should not be taken as limitations upon the invention. For example, it is contemplated that the number of intervals in delaying the reference clock and the number of fields for SDL and the DTC may be changed to suit one's particular circumstances. It is contemplated that many varied embodiments and applications incorporating the teachings of the present invention may be easily construed by those skilled in the art.

I claim:

1. An integrated circuit for synthesizing a digital waveform having a plurality of frequencies with respect to a reference signal, comprising:
   a synchronous delay line for generating a plurality of taps in response to receiving said reference signal;
   a digital-to-time domain converter connected to said synchronous delay line for generating said digital waveform from said plurality of taps;
   a waveform pattern register connected to said digital-to-time domain converter for synchronizing the synthesis of said digital waveform by said digital-to-time domain converter: and
   a pattern generator connected to said waveform pattern register for generating a waveform pattern.

2. The apparatus as defined in claim 1, wherein the multiplication of the frequency of said reference signal and that of said digital waveform is N.

3. The apparatus as defined in claim 2 wherein said N is an integer.

4. The apparatus as defined in claim 3 wherein said N is a rational number.

5. The apparatus as defined in claim 1, wherein said reference signal having a frequency that is different by a predetermined integer or rational number with that of said digital waveform.

6. The apparatus as difined in claim 5, wherein said synthesized waveform is pseudo random.

7. The apparatus as defined in claim 1 wherein said digital-to-time domain converter comprises a plurality of transmission gates coupled to a common output line.

8. The apparatus as defined in claim 1, wherein said waveform register comprses fields of master and slave flip-flops.

9. The waveform register as defined in claim 8, wherein fields of master and slave flip-flops further comprise three fields, said first comprising master flip-flops, said second field comprising pairs of master and slave flip-flops, and said third field comprising master-slave-master triads.

10. The apparatus as defined in claim 1, wherein said pattern generator compriese hard-wired pattern.

11. The apparatus as defined in claim 1, wherein said pattern generator comprises RAM/ROM arrays.

12. The apparatus as defined in claim 1, wherein said pattern generator comprises real time pattern generator.

13. An integrated circuit for generating a digital waveform having a plurality of frequencies with respect to a reference signal, comprising:
- a synchronous delay line for generating a plurality of taps in response to receiving said reference signal;
- a digital-to-time domain converter connected to said synchronous delay line for synthesizing said digital waveform from said plurality of taps;
- a waveform pattern register connected to said digital-to-time domain converter for sycnchronizing the synthesis of said digital waveform by said digital-to-time domain converter;
- a shifter connected to said waveform pattern register for shifting the position of pattern; and
- a pattern generator connected to said waveform pattern register for generating waveform.

14. The apparatus as defined in claim 13 wherein the multiplication of the frequency of said reference signal and that of said digital waveform is N.

15. The apparatus as defined n claim 14, wherein said N is an integer.

16. The apparatus as defined in claim 15, wherein said N is a rational number.

17. The apparatus as defined in claim 13, wherein said reference signal has a frequency that is differnt by a predetermined integer or rational number with that of said digital waveform.

18. The apparatus as defined in claim 17, wherein said synthesized waveform is pseudo random.

19. The apparatus as defined in claim 13, wherein said digital-to-time domain converter comprises a plurality fo transmission gates coupled to a common output line, each said transmission gates further comprising a pair of N and P devices.

20. The apparatus as defined in claim 13, wherein said waveform register comprises fields of master and slave flip-flops.

21. The waveform register as defined in claim 20, wherein fields of naster and slave flip-flops further comprise three fields, said first field comprising master flip-flops, said second field comprising pairs of master and slave flip-flops, and said third field comprising master-slave-master triads.

22. The apparatus as defined in claim 13, wherein said pattern generator comprises hard-wired pattern.

23. The apparatus as defined in claim 13, wherein said pattern generator comprises RAM/ROM arrays.

24. The apparatus as defined in claim 13, wherein said pattern generator comprises real time pattern generator.

* * * * *

UNITED STATES PATENT AND TRADEMARK OFFICE
CERTIFICATE OF CORRECTION

Page 1 of 2

PATENT NO. : 4,980,585
DATED : December 25, 1990
INVENTOR(S) : Mel Bazes

It is certified that error appears in the above-indentified patent and that said Letters Patent is hereby corrected as shown below:

| | | |
|---|---|---|
| Col. 2, Line 20 | Delete "utput" | Insert --output-- |
| Col. 2, Line 29 | Delete "psuedo-randown" | Insert --psuedo-random-- |
| Col. 3, Line 26 | Delete "shiftying," | Insert --shifting,-- |
| Col. 3, Line 55 | Delete "VOC" | Insert --VCO-- |
| Col. 4, Line 21 | Delete "descrebed" | Insert --described-- |
| Col. 4, Line 58 | Delete "seres" | Insert --series-- |
| Col. 4, Line 59 | Delete "pules" | Insert --pulse-- |
| Col. 5, Line 23 | Delete "." | after the word "clock" |
| Col. 6, Line 12 | Delete "high" | after the word "high" |
| Col. 6, Line 66 | Delete "swhitch" | Insert --switch-- |
| Col. 7, Line 41 | Delete "amoung" | Insert --among-- |
| Col. 7, Line 42 | Delete "thing" | Insert --things-- |
| Col. 7, Line 64 | Delete "and output" | after the word "and output" |
| Col. 8, Line 2 | Delete "copable" | Insert --capable-- |
| Col. 8, Line 12 | Delete "FGI. 1-10" | Insert --FIG. 1-10-- |
| Col. 8, Line 49 | Delete "difined" | Insert --defined-- |
| Col. 8, Line 55 | Delete "comprses" | Insert --comprises-- |
| Col. 8, Line 64 | Delete "compriese" | Insert --comprises-- |

UNITED STATES PATENT AND TRADEMARK OFFICE
CERTIFICATE OF CORRECTION

PATENT NO. : 4,980,585
DATED : December 25, 1990
INVENTOR(S) : Mel Bazes

It is certified that error appears in the above-indentified patent and that said Letters Patent is hereby corrected as shown below:

Col. 10, Line 14    Delete "naster"    Insert --master--

Signed and Sealed this

Seventeenth Day of August, 1993

Attest:

BRUCE LEHMAN

*Attesting Officer*    *Commissioner of Patents and Trademarks*